UNITED STATES PATENT OFFICE.

EMMANUEL BOURCART, OF CREIL, FRANCE, ASSIGNOR TO THE COMPAGNIE PARISIENNE DE COULEURS D'ANILINE, OF SAME PLACE.

GREEN DYE AND PROCESS OF MAKING SAME.

SPECIFICATION forming part of Letters Patent No. 615,472, dated December 6, 1898.

Application filed May 13, 1897. Serial No. 636,310. (No specimens.)

*To all whom it may concern:*

Be it known that I, EMMANUEL BOURCART, a citizen of Switzerland, residing at Creil, (Oise,) in the Republic of France, have invented certain new and useful Improvements in the Manufacture of Green Dyestuffs, of which the following is a specification.

The invention relates to the manufacture of a green dyestuff, being the nitro derivative of alkylated metaoxydiamidotriphenylcarbinol sulfonic acid obtained by treating the sulfonic acid of di or tetra alkylated metaoxyamidotriphenylmethane or its homologues with nitric acid and oxidizing the leuco compounds thus obtained.

I have found that sulfonic acids of di or tetra alkylated metaoxydiamidotriphenylmethane having the formula

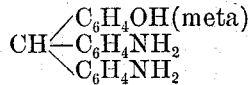

and its homologues produce leuco compounds when treated with concentrated nitric acid, which, according to the quantity of nitric acid employed, may be transformed by oxidation into the corresponding carbinol derivatives, which are green to yellow dyestuffs. "Carbinol" means, in the language of science, the compounds containing the atom group C(OH).

I proceed, for instance, as follows: Twenty-five kilograms of the disulfonic acid of meta-oxytetraethyldiamidotriphenylmethane are dissolved at about 50° centigrade in seventy-five kilos of concentrated sulfuric acid. This solution is cooled below 0° centigrade, while nine kilos of nitric acid of 40° Baumé are slowly added, so as not to raise the temperature above 5° centigrade. The product of the reaction is then run into about three hundred liters of ice-water and the solution mixed with soda-lye till a neutral reaction takes place. The nitro-leuco-sulfonic acid thus precipitated is filtered off. Twenty-five kilograms of the leuco-sulfonic acid thus prepared are dissolved in five hundred liters of water and the requisite quantity of ammonia or soda, and the solution is then oxidized with the calculated quantity of sulfuric acid and lead dioxid. The green dyestuff solution is filtered off from the lead sulfate and the dyestuff solution is evaporated or the dyestuff salted out.

The new dyestuff forms a powder of metallic luster, soluble in water with a green color, less soluble in alcohol. Its aqueous solution is not changed by the addition of diluted mineral acids, soda, or ammonia, turning violet when boiled with soda-lye under development of alkylamin.

The dyestuff dyes wool and silk green in an acid-bath, the tints being characterized by their great fastness to alkalies.

Having thus described my invention, I claim as new and desire to secure by Letters Patent—

1. The process herein of producing a green dyestuff, which consists in treating the sulfonic acids of alkylated metaoxydiamidotriphenylmethane or their homologues at a low temperature with concentrated nitric acid, and then oxidizing the leuco compounds thus obtained, substantially as described.

2. As a new product, a green dyestuff, being the nitro derivative of alkylated meta-oxydiamidotriphenylcarbinol sulfonic acid, obtained in the form of a powder of metallic luster, soluble in water with a green color, less soluble in alcohol, its aqueous solution being not changed by diluted mineral acids, soda or ammonia, turning violet when boiled with soda-lye and developing alkylamin and dyeing wool and silk green in an acid-bath, substantially as set forth.

In testimony that I claim the foregoing as my invention I have signed my name in presence of two subscribing witnesses.

EMMANUEL BOURCART.

Witnesses:
JEAN GAILLET,
JOSEPH FAYOLLAT.